US007817620B1

(12) United States Patent
Jones et al.

(10) Patent No.: US 7,817,620 B1
(45) Date of Patent: Oct. 19, 2010

(54) DELAYED CALL ESTABLISHMENT

(75) Inventors: Paul Edwin Jones, Apex, NC (US); Oscar E. Arenas, Dunwoody, GA (US); Kang Yin, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1331 days.

(21) Appl. No.: 10/645,724

(22) Filed: Aug. 20, 2003

(51) Int. Cl.
*H04L 12/66* (2006.01)
*H04M 3/42* (2006.01)

(52) U.S. Cl. .................................. 370/352; 379/210.01

(58) Field of Classification Search ................. 370/389, 370/351–356, 401, 252, 329, 431, 465; 379/210.01; 709/227, 228
See application file for complete search history.

(56) References Cited

U.S. PATENT DOCUMENTS

| | | | | |
|---|---|---|---|---|
| 6,366,577 | B1 * | 4/2002 | Donovan | 370/352 |
| 7,046,680 | B1 * | 5/2006 | McDysan et al. | 370/396 |
| 7,149,299 | B2 * | 12/2006 | Triano et al. | 379/210.01 |
| 7,170,888 | B2 * | 1/2007 | Yoo | 370/352 |
| 2003/0149775 | A1 * | 8/2003 | O'Neill | 709/227 |
| 2004/0139088 | A1 * | 7/2004 | Mandato et al. | 707/100 |
| 2004/0162094 | A1 * | 8/2004 | Riikonen et al. | 455/502 |
| 2004/0202303 | A1 * | 10/2004 | Costa-Requena et al. | 379/205.01 |

OTHER PUBLICATIONS

ITU T (Telecommunication Standardization Sector of ITU) H.323 (Nov. 2000) Series H: Audiovisual and Multimedia Systems, Infrastructure of audiovisual services—Systems and terminal equipment for audiovisual services, "Packet-based multimedia communications systems" (242 pages).
RFC (Request for Comments) 3261, SIP: Session Initiation Protocol, Rosenberg, et al., Jun. 2002 (244 pages).

* cited by examiner

*Primary Examiner*—Nittaya Juntima
(74) *Attorney, Agent, or Firm*—Marger Johnson & McCollom PC

(57) ABSTRACT

A network device having delayed call establishment is disclosed. The network device includes a port to allow the device to communicate with a called endpoint and a processor. The processor sends a call request message associated with a call to the called endpoint and receives a notification that a delay point has been reached. Alternatively, the network device includes a port to allow the device to communicate with a calling endpoint and a processor. The processor receives a call request message associated with a call from the calling endpoint, responds with a notification of delayed call establishment availability; and processes the call to a delay point. Once the delay point has been reached the processor determines if the call is to be established, and if the call is to be established, notify the called endpoint.

35 Claims, 5 Drawing Sheets

DELAYED CALL ESTABLISHMENT

BACKGROUND

In packet-based multimedia networks, such as those in accordance with the International Telecommunications Union (ITU) Recommendation H.323 or the Internet Engineering Task Force (IETF) RFC 3261 (SIP), the capability to initiate a call without completing it, delay alerting the called user or entity, or prematurely releasing the call before alerting the called user or entity, may prove useful. This deliberate delay in alerting the user, or prematurely releasing the call, is referred to here as delayed call establishment.

Generally, two types of calls are used in H.323 networks. The first is real, or actual, calls, where one endpoint calls the other and the user's phone rings. The other type of call may be referred to as non-call associated services, such as a message waiting indicator. Within SIP networks, only real or actual calls exist.

In the case of real calls, it is impossible for a system to initiate a call for whatever purpose for which it does not want the user to be aware, as it would cause the user's phone to ring. On the other hand, if the call were initiated for some purpose and the goal is to be able to complete the call only after certain events occur or certain requirements are satisfied, albeit with a delay, non-real calls are not useful, as they cannot be converted into real calls.

The reasons for initiating a call, but not completing it or alerting the called party, may be varied. For example, a calling endpoint may want to perform a feature discovery process on the other endpoint. If the features between endpoints match, the call could then be progressed to the established state. However, in current implementations, the user's phone would ring and then there would be a delay while feature discovery is performed. The possibility exists that features will not match and the call cannot be completed.

Similarly, the ability to delay call establishment may be useful for providing services such as call completion on busy and call completion on no answer, where for instance, an intermediate device between the calling endpoint and the receiving endpoint continues to call the receiving endpoint until the line is not busy. Once the line is no longer busy, the intermediate device calls the calling endpoint and completes the call. Currently, this is not possible in H.323 or SIP networks. Other uses may include quality of service testing and coordinating with policy enforcement functions to manipulate media ports during call establishment.

SUMMARY

One embodiment of the invention is a network device. The network device includes a port to allow the device to communicate with a called endpoint and a processor. The processor sends a call request message associated with a call to the called endpoint and receives a notification that a delay point has been reached. Once the delay point has been reached the processor determines if the call is to be established, and if the call is to be established, notify the called endpoint.

Another embodiment of the invention is a method to delay call establishment. The method transmits a call request and identifies a delay point. If delayed call establishment is available, a notification that a delay point has been reached may be received. If the call is to be established the called endpoint is notified and the call is completed. The method may not require an explicit indication that the delay point has been reached or an explicit notification to progress the call. For example, the calling device may instruct the called endpoint to proceed automatically once the delay point is reached.

Another embodiment of the invention is a network device. The network device includes a port to allow the device to communicate with a calling endpoint and a processor. The processor receives a call request message associated with a call from the calling endpoint and responds with a notification of delayed call establishment availability. The processor processes the call to a delay point, if one has been specified by the calling endpoint, at which point the processor further transmits a notification that the delay point has been reached. The processor determines if the call is to be established and, if the call is to be established, it notifies a user.

Another embodiment of the invention is a method to delay call establishment at the called endpoint. A call request with delayed call establishment requested is received. The calling endpoint is notified of the delayed call establishment availability. The call setup proceeds until the delay point is reached. When the delay point is reached, the called endpoint may notify the calling endpoint, unless no explicit indication is requested. The call is then processed according to instructions from the calling endpoint.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
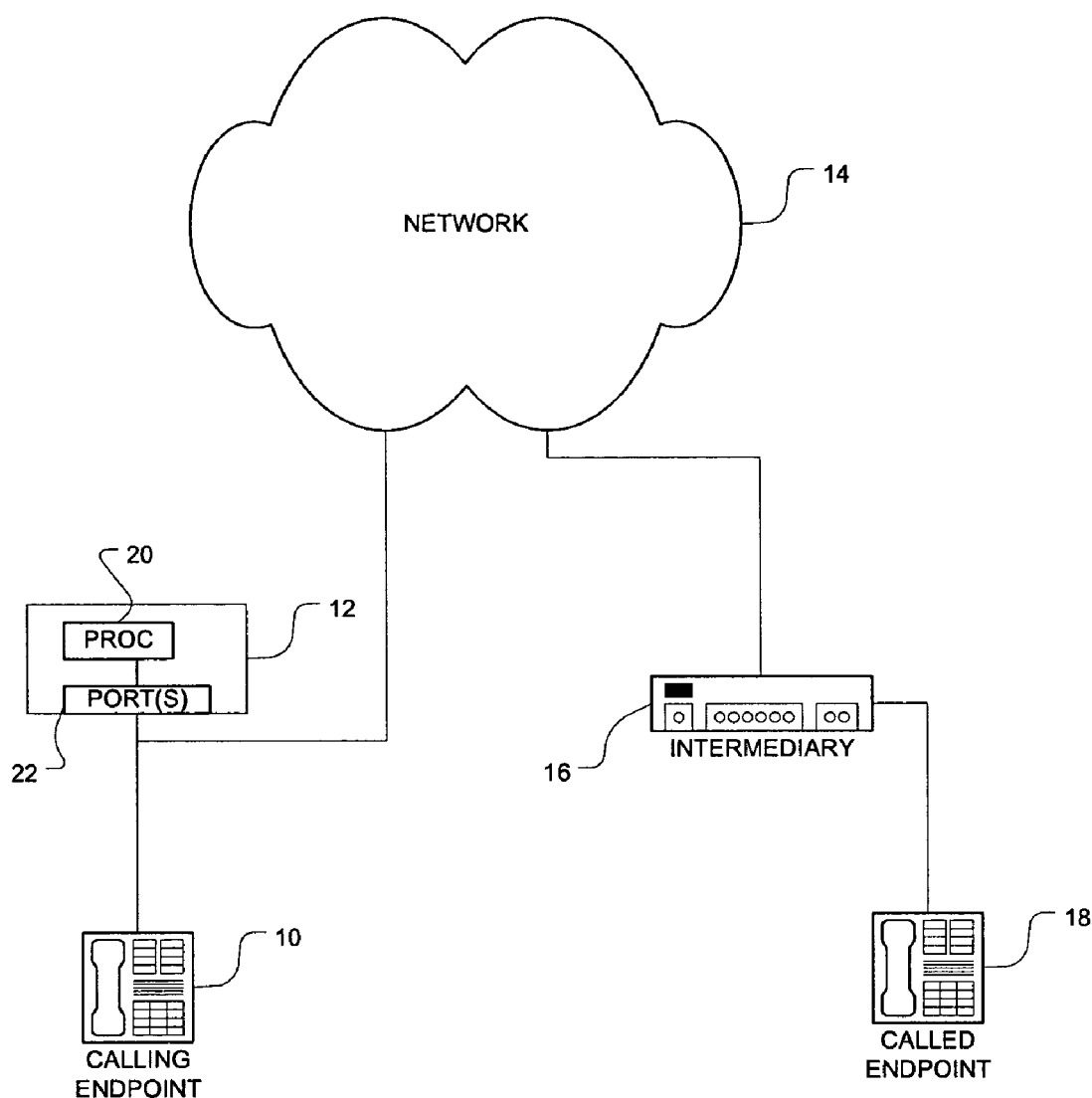
FIG. 1 shows a voice over data networks telephony system.

FIG. 1 shows a telephony system. In the telephony system, the phone calls between users are relayed across a data network, such as an Internet Protocol (IP) network. These types of calls are usually referred to as voice over IP systems (VoIP), and may be referred to as such here. No limitation to IP networks is implied or intended, as the implementations of the embodiments of the invention may be used for data networks other than IP.

In the system, a user at calling endpoint 10 places a call to a user at the called endpoint 18. In some instances, the calling endpoint may be a traditional, publicly switched telephone network (PSTN), telephone with a handset and base. In others, the calling endpoint may be a computer equipped with a headset, modem and a microphone. Many other alternatives may also exist, such as VoIP or network phones, etc.

The calling endpoint generally connects to an intermediary of some kind. In H.323, an International Telecommunications Union (ITU) recommendation titled "Packet Based Multimedia Communications Systems," this entity may be a gatekeeper. In Session Initiation Protocol (SIP) systems, the entity may be a SIP proxy server. These intermediaries 12 and 16 connect the calling endpoint 10 with the called endpoint 18.

The intermediary, which may be device 12 or 16, may be a network device having a processor 20 and port or ports 22. The ports 22 allow the device to make connection with the network and communicate with the endpoint through the port. The endpoints may also be configured in a similar manner as the intermediaries, with ports and processors. The embodiments of the invention may be implemented as an article of machine-readable media used to provide the machines such as the intermediaries or the endpoints with instructions. When the instructions are executed, the machine performs the methods of the invention. These methods will be discussed in more detail below.

As was mentioned previously, situations may arise where it is beneficial for a calling endpoint to initiate a call with a called endpoint, but delay the establishment of the call. One benefit of delayed call establishment would be to determine the capabilities of the endpoint. In H.323 for example, most entities may initiate either a 'real' call or call-independent supplementary service signaling, which may be referred to as a non-call. The non-call case may not be suitable for feature discovery, as some features may not be exchanged during the supplementary service signaling. If it becomes desirable to turn the call into a real call, if the sought after features are available, a non-call would be unsuitable, as it cannot be turned into a real call.

Another benefit may allow network entities to provide supplementary services, such as call completion on busy and call completion on no answer. In these situations, it will be an intermediary, rather than an endpoint, performing the delayed call establishment exchanges discussed below. Call completion on busy and call completion on no answer allow the user at the calling station to turn over the completion of the call to another device, rather than having to continually re-dial to reach the called user.

There is a recommendation for these completion services in H.323, recommendation H.450.9 "Call Completion Supplementary Services for H.323." This recommendation requires more development on the endpoint than utilizing a delayed call establishment process. In order to provide accurate billing records, this recommendation uses a complicated 'call linkage' field and the subsequent correlation of the call records with previous calls. Even a temporary loss of power to the endpoint may render H.450.9 useless. Using delayed call establishment, an intermediary could periodically initiate a call to the called endpoint and instruct it to delay call establishment, thereby not alerting the called entity. Once it is determined that the called entity is available, the intermediary could then initiate a call to the calling endpoint, allow the initial call to proceed, and bridge the call legs.

Another possible benefit of delayed call establishment is for continuity or quality of service (QoS) testing or other diagnostic testing. In H.323, for example, there is a testing mode wherein media may be looped back to the calling device. However, no current signaling mechanisms allow an endpoint to distinguish between a normal call and a testing call. The called user's phone would ring. The use of delayed call establishment would allow operators and administrators to tests without alerting the user.

It must be noted that a 'user' as the term is used here does not necessarily mean a human being. The 'user' may be an automated system, such as an interactive voice response system. The user is alerted, even if that user is an automated or other non-living system.

Another possible use of delayed call establishment allows a policy enforcement function to ensure that media ports are properly opened prior to call completion. If policy enforcement is done in parallel with call establishment and not coordinated, it is possible that the call could be established and media could flow before ports are properly opened. This may result in media clipping, degrading the quality of service. All of these issues may be resolved with the use of delayed call establishment.

In order to understand the embodiments of the invention, some definitions may be helpful. Delayed call establishment as used here means a process in which a call is allowed to be initiated, but not to progress to the point where the user is alerted or the call is connected. As part of this process, the call may reach a delay point (DP), which is the point in the call establishment process that must be reached before the call may proceed to the Alerting or Connected state in H.323 terminology or '180 Ringing' or '200 OK' in SIP terminology. The delay point is some point in the call establishment process to which the called endpoint shall progress the call before pausing the call establishment process. Specifically, delaying the call establishment essentially means that signaling messages may be exchanged up to and even after the delay point is reached, but the called user is never alerted. DP Reached, or DPR, is a message transmitted by the called endpoint to the calling endpoint to indicate that the DP has been reached. DCE Release, Delayed Call Establishment Release, is a message transmitted by the calling entity to the called endpoint releasing the endpoint from the DCE procedures and allowing the call to proceed as normal. The DCE Release may be implicit in the case wherein the calling entity did not request explicit notification of DPR.

Figure 2:
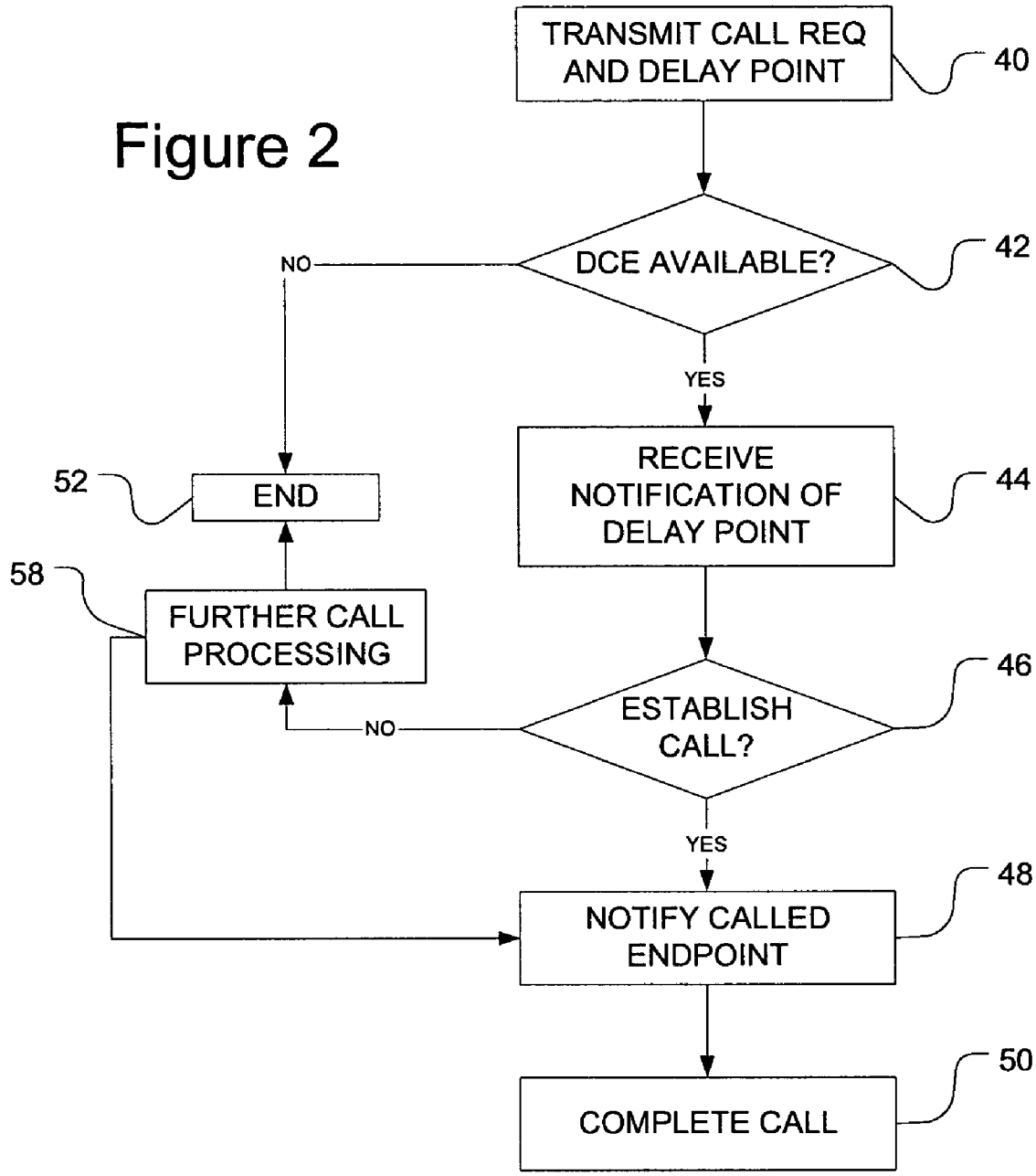
FIG. 2 shows a flowchart of an embodiment of a method to initiate a call with delayed call establishment.

A method of delayed call establishment is shown in FIG. 2. At 40 a call request associated with a call is transmitted from a calling endpoint to a called endpoint. The call request, which may be an incoming call, may also included the delay point to which the calling endpoint wants the called endpoint to progress to before delaying the call establishment. When the called endpoint receives the incoming call request, it would typically advertise this capability in the list of supported features when responding to the request. If the called endpoint does not support delayed call establishment capabilities, then the call may proceed as a normal call or may terminate, depending on whether the capability was advertised as a mandatory or desired feature.

The delay point may be included using a Delay Point Indicator, which indicates a point of interest to the calling entity in the establishment process. The DPI may have several possible meanings. A list of examples is shown in the following table.

| DPI Value | Meaning |
| --- | --- |
| 0 | NULL/Explicit Notification |
| 1 | Terminal Capabilities are received by the called endpoint |
| 2 | Master/Slave determination complete |
| 3 | Media channels are opened from the called endpoint |
| 4 | Media channels are opened to the called endpoint |
| 5 | Media channels are established bi-directionally |

The DPI values in the above example are independent and suggest no ordering of events. For example, it is possible that media may be established bi-directionally prior to the determination of Master/Slave in H.323 networks. NULL/Explicit Notification simply indicates that no explicit conditions exist that must be satisfied before reaching the Delay Point. The DP is reached immediately upon reception of the initial setup message. For example, sending NULL in an outgoing H.323 Setup message merely means that the called endpoint has nothing more to do than to determine that it is ready to proceed with call establishment, indicating that the called endpoint is not busy. The DP is the point at which all of the conditions are satisfied. If the DPI is 2 and 5, the DP is when both the Master/Slave negotiation is completed and the bi-direction media flows are opened.

Upon reception of a call setup message that includes a DCE request and a DPI, the called endpoint should respond indicating support or no support. This allows the calling endpoint to know whether or not DCE is available at 42. If DCE is available, the called endpoint will progress the call to the Delay Point and then, if explicit notification is requested, notify the calling entity that the point has been reached. When explicit notification is requested, the calling entity then receives the notification of delay point at 44.

The called entity may transmit the Delay Point Reached (DPR) message through an appropriate message, such as a Facility message in H.323 or 183 (Session Progress) in SIP, with the DCE capability advertised and the DPR parameter. In one embodiment the DPR parameter may have a parameter identifier by not an associated type. In another embodiment, no explicit capability advertisement is required.

At 46, the calling entity optionally determines whether or not to proceed with the call establishment. In one embodiment this may be implicitly assumed to be true by the called entity. Determining that the call should be established at 46 will result in the user being notified at the called endpoint or the call will simply be connected. If the goal of the call were for a non-user reason, such as QoS testing, the calling entity would not want the call establishment to continue. If the call is to be established and explicit indication is required, the calling endpoint notifies the called endpoint at 48 by sending a DCE Release message. This notifies the called endpoint that it is time to alert the user, ultimately resulting in the called endpoint completing the call at 50.

If the user is not to be alerted, such as a call for testing purposes, the called endpoint will not receive a DCE Release message until further call processing is performed at 58. The called endpoint will be released from DCE upon termination of the call at 52. It is also possible that the call will perform other call processing and then progress back to process 48 to complete the call. For example, the intermediate entity may want to establish media, test for quality and, seeing acceptable quality, progress the call to an established state.

Figure 3:
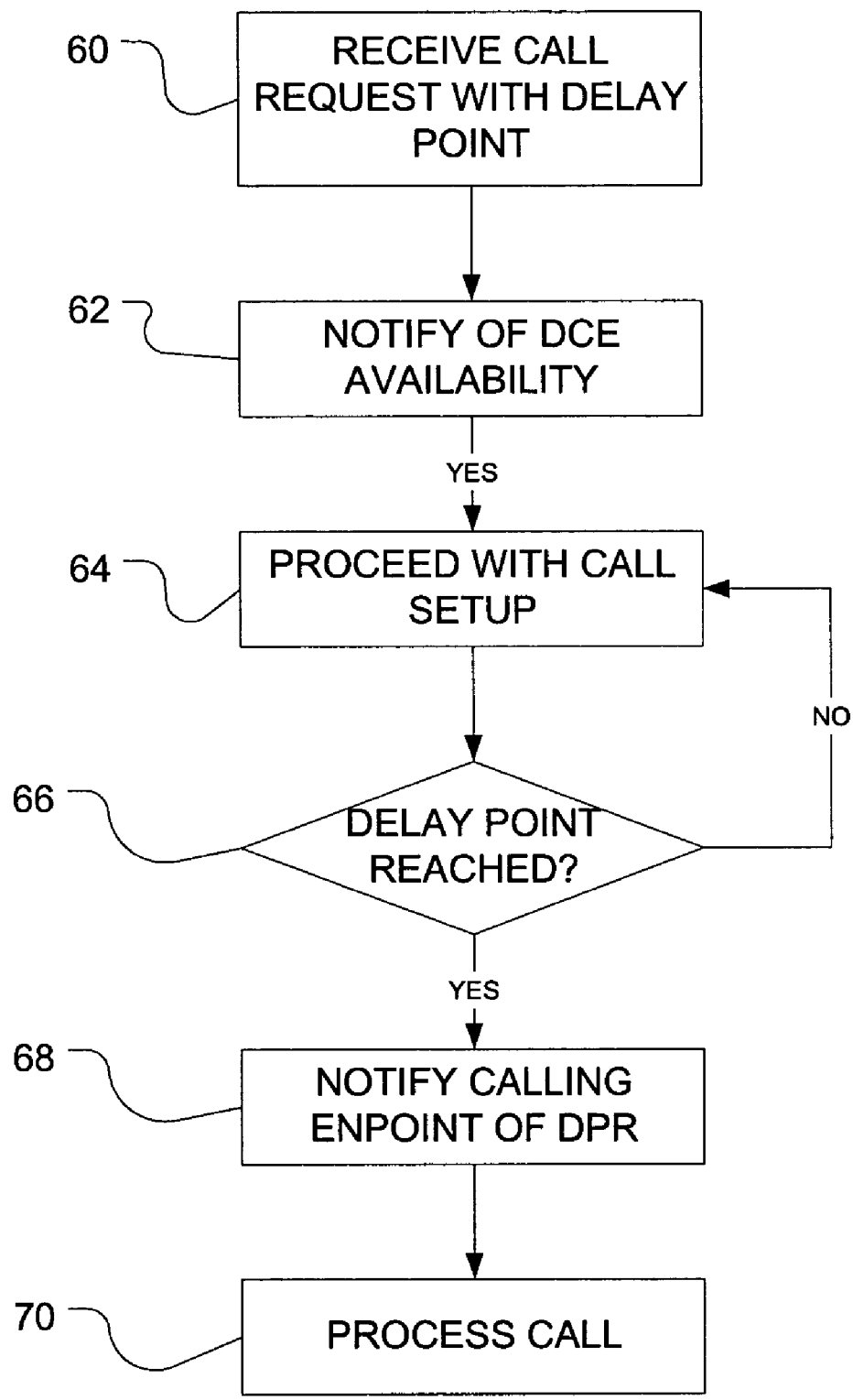
FIG. 3 shows a flowchart of an embodiment of a method to receive a call with delayed call establishment.

An embodiment of a method to provide delayed call establishment as seen from the called endpoint is shown in FIG. 3. At 60 the called endpoint receives the call request will the delay point indicated by the DPI. If the called endpoint does not have DCE capability, the process would end. For the purpose of this discussion, the endpoint will be assumed to have DCE capability. The called endpoint will usually send the capability advertisement in response to the request at 62. The called endpoint then proceeds with call setup at 64, continuing to monitor for the delay point being reached at 66. It must be noted that if the DPI received in the call request message is NULL, proceeding with the call setup may include only acknowledging that that Setup (H.323) or INVITE (SIP) message was received and that the delay point has been reached.

Once the delay point has been reached, at 66, the called endpoint, if not instructed otherwise, transmits a DPR message to the calling endpoint at 68. The call is then processed according to the instructions, or lack of instructions, from the calling endpoint at 70. The instruction from the calling endpoint may be a DCE Release message, which would result in the call processing at 70 being the task of alerting the user. Note that a DCE Release may be implicit, if so indicated in the initial call signaling messages.

Figure 4:
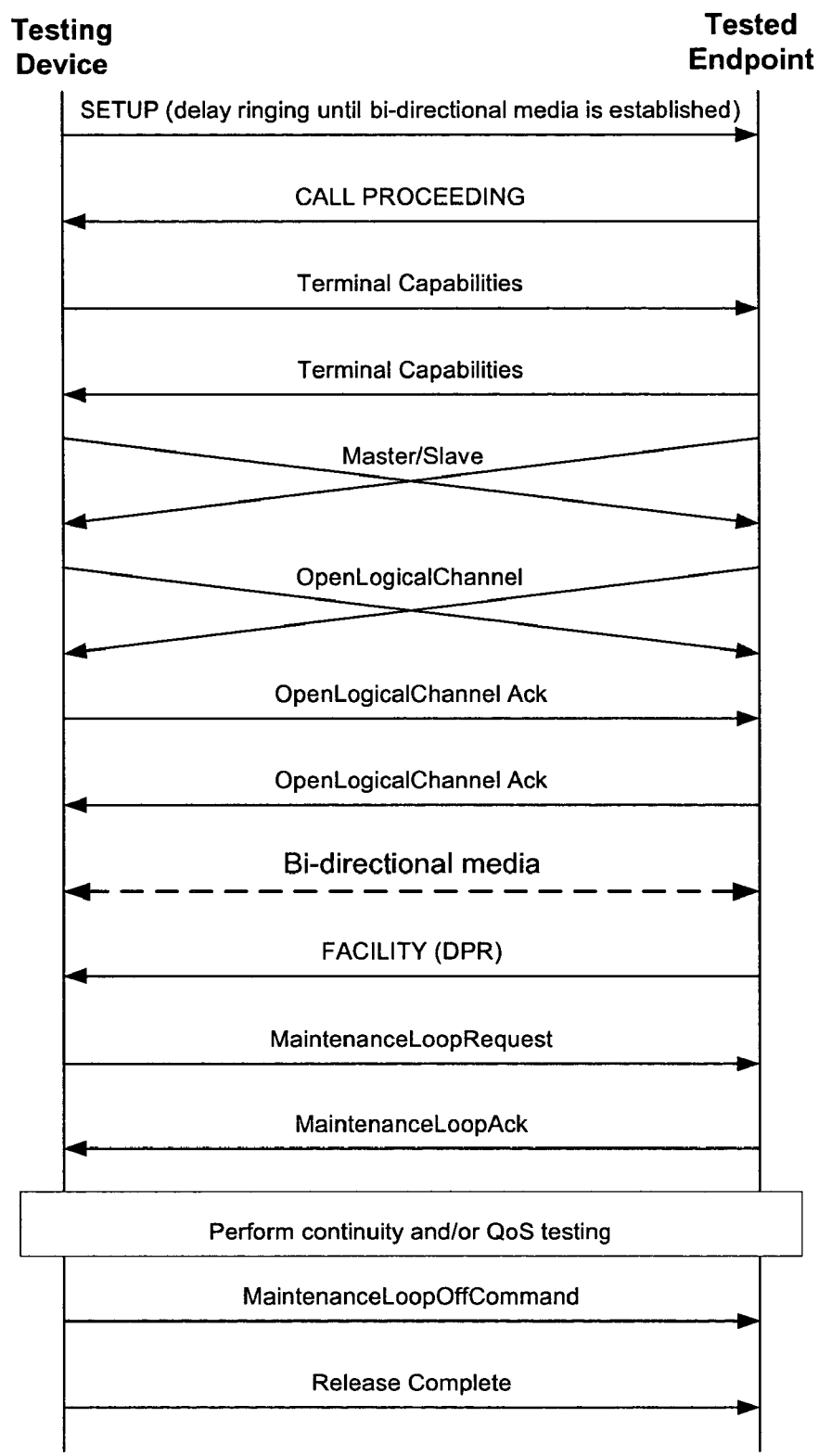
FIG. 4 shows a call flow diagram of one example of delayed call establishment for maintenance purposes.
Figure 5:
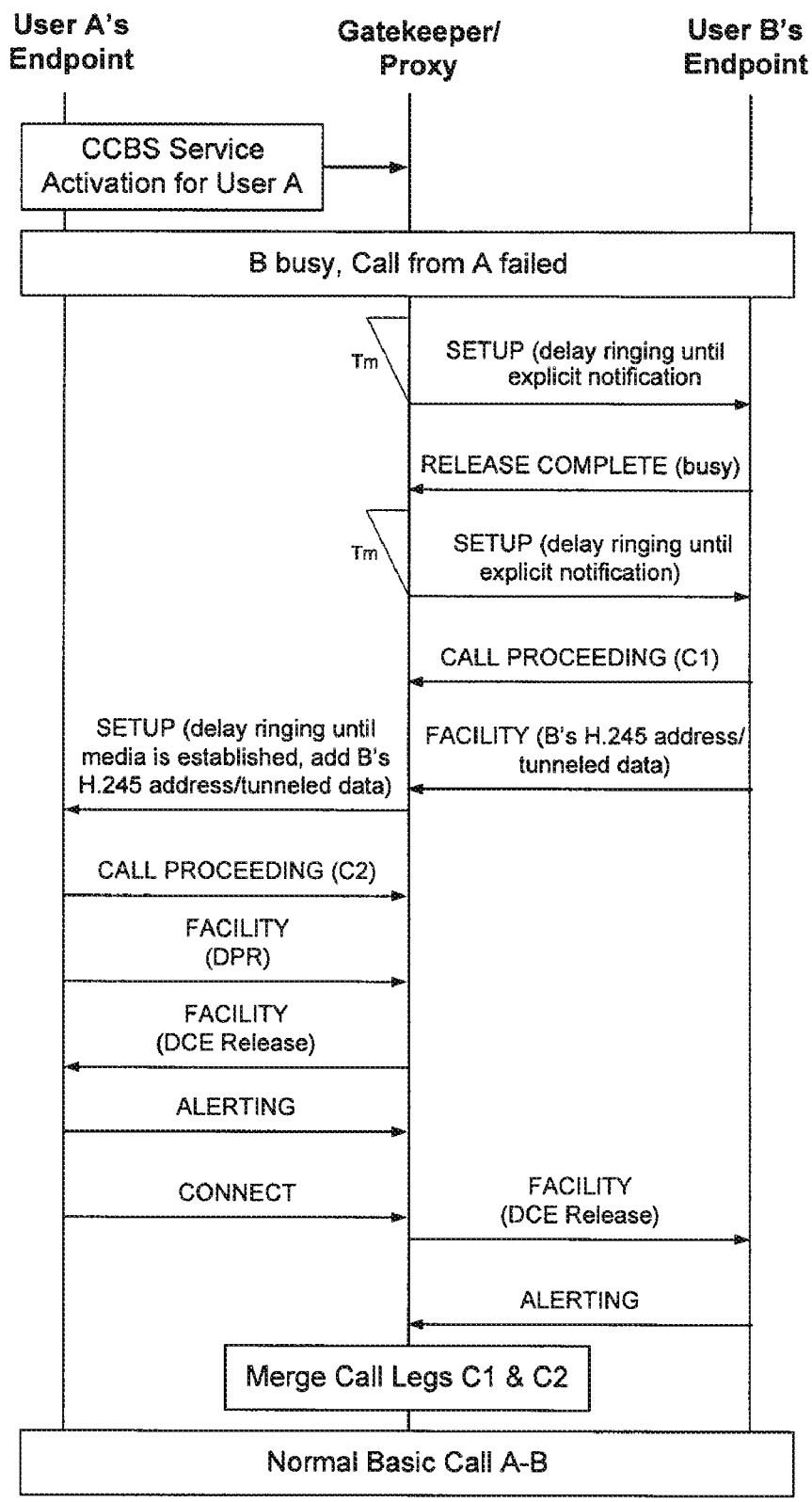
FIG. 5 shows a call flow diagram of an example of delayed call establishment in a call back busy signal situation.

Examples of situations in which delayed call establishment may be used are shown in FIGS. 4 and 5. FIG. 4 shows a call flow for continuity, QoS, or other testing. In FIG. 4, the testing device transmits a setup message with the delay point being reached when bi-directional media is established. The term endpoint was used above, and it must be noted that the calling entity may not be an actual endpoint, such as a user's phone. It may be a network intermediary that initiates testing, but that will act as the calling endpoint in this type of situation.

The tested endpoint transmits a call proceeding message. Terminal capabilities are exchanged and Master/Slave negotiation takes place. The logical channel signaling occurs and then bi-direction media is established. At this point, the tested endpoint transmits a facility or other appropriate message with the DPR indicator contained within it. In this example, the call purpose was to perform maintenance testing, so maintenance loop requests and acknowledgements are exchanged, and the testing commences. Upon the end of the testing, the maintenance mode is exited and the call is released. This entire process did not involve any user notification. Maintenance may include quality of service (QoS) testing, service level verification, probing endpoints, querying for services supported by a device, etc.

In FIG. 5, an example of an implementation of delayed call establishment in conjunction with call completion on busy signal (CCBS) service is shown. User A starts the process by calling user B with CCBS activated. When the call fails, an intermediary device such as an H.323 Gatekeeper or SIP proxy transmits a Setup or INVITE request with a delay point identified as explicit notification. The called endpoint will transmit release messages indicating that the phone is busy. Periodically, the intermediary will re-attempt the call to User B. Once the phone is no longer busy, the called endpoint B sends a call proceeding or other appropriate message.

The intermediary then transmits a Setup message to the calling endpoint where user A resides. The delayed call establishment message includes the delay point of explicit notification. The endpoint A then informs the intermediary that the call is proceeding.

At this point in the process, the two legs will be joined. The calling endpoint sends a DPR message and the intermediary responds with DCE Release, allowing the calling endpoint to notify user A that the call is going through. The intermediary then transmits the DCE Release message to the called endpoint, and the called endpoint alerts the user. The two users are now on the line and the intermediary bridges the two call legs and the call proceeds as normal.

Most of the examples given above are based upon H.323 signaling. In Session Initiation Protocol (SIP) there are messages and parameters that are analogous to those discussed above. For example, in SIP the initial call setup message is INVITE, rather than Setup. The response to the invitation message would be where the DCE capability would be advertised in response to an INVITE message that has DCE requested. Similarly, the call negotiation messages could easily be translated into SIP, with the intermediary being a SIP proxy server, rather than an H.323 Gatekeeper.

Thus, although there has been described to this point a particular embodiment for a method and apparatus for delayed call establishment, it is not intended that such specific references be considered as limitations upon the scope of this invention except in-so-far as set forth in the following claims.

What is claimed is:

1. A network device, comprising:
   a port to allow the device to communicate with a called endpoint; and
   a processor to:
   send a call request message associated with a call to the called endpoint;

indicate a desire to delay call establishment until a delay point is reached, the delay point indicating a point to which the call is to progress before delaying establishment of the call;

send a release message after the delay point has been reached indicating that the establishment of the call should continue from the delay point if the call is to be established; and send a release message after the delay point has been reached indicating that the establishment of the call should not continue if the call is to be ended.

2. The network device of claim 1, wherein the processor further to receive a notification that a delay point has been reached.

3. The network device of claim 1, in which the network device comprises a calling endpoint.

4. The network device of claim 1, wherein the processor is further configured to:

perform diagnostic testing with the called endpoint; and send the release message indicating that the establishment of the call should not continue without alerting a user of the called endpoint after performing the diagnostic testing.

5. The network device of claim 1, wherein the delay point is a point at which media ports are properly opened.

6. The network device of claim 1, the call request message, the call, and the delay point referred to as a first call request message, a first call, and a first delay point, respectively, wherein the processor is further configured to:

repeat sending the first call request message associated with the first call to the called endpoint and indicating the desire to delay call establishment of the first call until the first delay point is reached; and receive a message from the called endpoint indicating that the first call is proceeding; and send a second call request message associated with a second call to a calling endpoint after receiving the message from the called endpoint indicating that the first call is proceeding, the second call request message including a second delay point to which the second call is to progress before delaying establishment of the second call.

7. The network device of claim 6, wherein the processor is further configured to receive a notification from the calling endpoint indicating that the second delay point has been reached.

8. The network device of claim 7, wherein the processor is further configured to send a first release message to the calling endpoint after receiving the notification from the calling endpoint, the first release message indicating that call establishment of the second call should continue.

9. The network device of claim 8, wherein the processor is further configured to send a second release message to the called endpoint indicating that call establishment of the first call should continue.

10. The network device of claim 9, wherein the processor is further configured to merge the first call and the second call.

11. A method of delaying call establishment, the method comprising:

transmitting, from a network device, a call request message associated with a call to a called endpoint, the call request message including a delay point, the delay point indicating a point to which the call is to progress before delaying establishment of the call;

sending a release message, from the network device, after the delay point has been reached indicating that the establishment of the call should continue from the delay point if the call is to be established; and sending a release message, from the network device, after the delay point has been reached indicating that the establishment of the call should not continue if the call is to be ended.

12. The method of claim 11, the method comprising receiving a notification from the called endpoint that the delay point has been reached.

13. The method of claim 11, further comprising:

performing maintenance testing with the called endpoint; and wherein the release message indicating that the establishment of the call should not continue is sent after performing the maintenance testing and without notifying the called endpoint to alert a called user;

wherein maintenance comprises at least one of the group comprised of: quality of service (QoS) testing, service level verification, probing endpoints, querying for services supported by a device.

14. The method of claim 11, wherein transmitting the call request message comprises transmitting a session initiation protocol INVITE message.

15. The method of claim 11, wherein transmitting the call request message comprises transmitting an H.323 Setup message.

16. A method of delayed call establishment, the method comprising:

receiving, at a network device at a called endpoint, a call request message associated with a call, the call request message including a delay point indicating a point to which the call should progress before delaying establishment of the call;

delaying establishment of the call, at the network device, after reaching the delay point, continuing with establishment of the call from the delay point if a release message is receiving, at the network device, indicating that the establishment of the call should continue from the delay point; and ending the call without notifying a user of the called endpoint if a release message is receiving, at the network device, indicating that the call should not be established.

17. The method of claim 16, the method comprising:

transmitting a response indicating availability of delayed call establishment; and progressing the call to the delay point.

18. The method of claim 16, the method comprising notifying a calling endpoint that that delay point has been reached.

19. The method of claim 16, further comprising alerting a user, of the called endpoint, of the call in response to receiving the release message, at the network device, indicating that the establishment of the call should continue from the delay point.

20. The method of claim 16, wherein ending the call without notifying a user of the called endpoint comprises:

performing maintenance testing with a calling endpoint without alerting a user of the called endpoint;

ending the call after performing the maintenance testing without notifying the user of the called endpoint in response to receiving the release message, at the network device, indicating that the establishment of the call should not be established.

21. A network device, comprising:

a port to allow the device to communicate with a calling endpoint;

a processor to:

receive a call request message associated with a call from the calling endpoint, the call request message including a delay point indicating a point to which the call should progress before delaying call establishment;
process the call to the delay point;
delay establishment of the call after reaching the delay point;
continue with establishment of the call from the delay point if a release message indicating that the establishment of the call should continue from the delay point is received; and
end the call without notifying a user of a called endpoint associated with the call if a release message indicating that the call should not be established is received.

22. The network device of claim 21, wherein the processor further to transmit a notification that the delay point has been reached.

23. The network device of claim 21, wherein the processor further to determine if the call is to be established and, if the call is to be established, notify the user of the called endpoint.

24. The network device of claim 21, in which the network device comprises the called endpoint.

25. The network device of claim 11, in which the network device comprises an intermediary between the calling endpoint and the called endpoint.

26. The network device of claim 21, wherein the processor is further configured to:
perform diagnostic testing with the calling endpoint; and
end the call in response to receiving the release message indicating that the establishment of the call should not continue without alerting a user of the called endpoint after performing the diagnostic testing.

27. The network device of claim 21, wherein the delay point is a point at which media ports are properly opened.

28. An article of non-transitory computer-readable media storing computer executable instructions that, when executed, cause computer to:
transmit a call request message associated with a call to a called endpoint, the call request message identifying a delay point to which the call should progress before delaying establishment of the call;
send a release message after the delay point has been reached indicating that the establishment of the call should continue from the delay point if the call is to be established; and
send a release message after the delay point has been reached indicating that the establishment of the call should not continue if the call is to be ended.

29. The article of claim 28, wherein the instructions further causing the computer to receive a notification from the called endpoint that the delay point has been reached.

30. The article of claim 28, wherein the instructions further causing the computer to:
perform maintenance testing with the called endpoint; and
send the release message indicating that the establishment of the call should not continue without notifying the called endpoint to alert a called user after performing the maintenance testing;
wherein maintenance comprises at least one of the group comprised of: quality of service (QoS) testing, service level verification, probing endpoints, querying for services supported by a device.

31. An article of non-transitory computer-readable media containing computer executable instructions that, when executed, cause computer to:
receive a call request message associated with a call, the call request message including a delay point indicating a point to which the call should progress before delaying establishment of the call;
delay establishment of the call after reaching the delay point;
continue with establishment of the call from the delay point if a release message indicating that the establishment of the call should continue from the delay point is received; and
end the call without notifying a user of the called endpoint if a release message indicating that the call should not be established is received.

32. The article of claim 31, the instructions further causing the computer to
transmit a response indicating availability of delayed call establishment; and
progress the call to the delay point.

33. The article of claim 31, the instructions further causing the computer to notify the calling endpoint that that delay point has been reached.

34. A network device, comprising:
a means for allowing the device to communicate with a called endpoint;
a means for sending a call request message associated with a call to the called endpoint, the call request message including a delay point indicating a point to which the call is to progress before delaying establishment of the call;
a means for sending a release message, from the network device, after the delay point has been reached indicating that the establishment of the call should continue from the delay point if the call is to be established; and
a means for sending a release message, from the network device, after the delay point has been reached indicating that the establishment of the call should not continue if the call is to be ended.

35. A network device, comprising:
a means for allowing the device to communicate with a calling endpoint;
a means for receiving a call request message associated with a call from the calling endpoint, the call request message including a delay point, the delay point indicating a point to which the call should progress before delaying call establishment;
a means for processing the call to the delay point;
a means for delaying establishment of the call after reaching the delay point;
a means for continuing with establishment of the call from the delay point if a release message indicating that the establishment of the call should continue from the delay point is received; and
a means for ending the call without notifying a user of the called endpoint if a release message indicating that the call should not be established is received.

* * * * *

UNITED STATES PATENT AND TRADEMARK OFFICE
CERTIFICATE OF CORRECTION

| | | |
|---|---|---|
| PATENT NO. | : 7,817,620 B1 | Page 1 of 1 |
| APPLICATION NO. | : 10/645724 | |
| DATED | : October 19, 2010 | |
| INVENTOR(S) | : Paul Edwin Jones et al. | |

It is certified that error appears in the above-identified patent and that said Letters Patent is hereby corrected as shown below:

Column 8, line 33, the word "point," should read -- point; --;
Column 9, line 22, the word "11" should read -- 1 --.

Signed and Sealed this
Sixth Day of March, 2012

David J. Kappos
*Director of the United States Patent and Trademark Office*